Sept. 5, 1933.    R. G. GRISWOLD ET AL    1,925,380
ROTARY TRANSMISSION
Filed Jan. 15, 1929
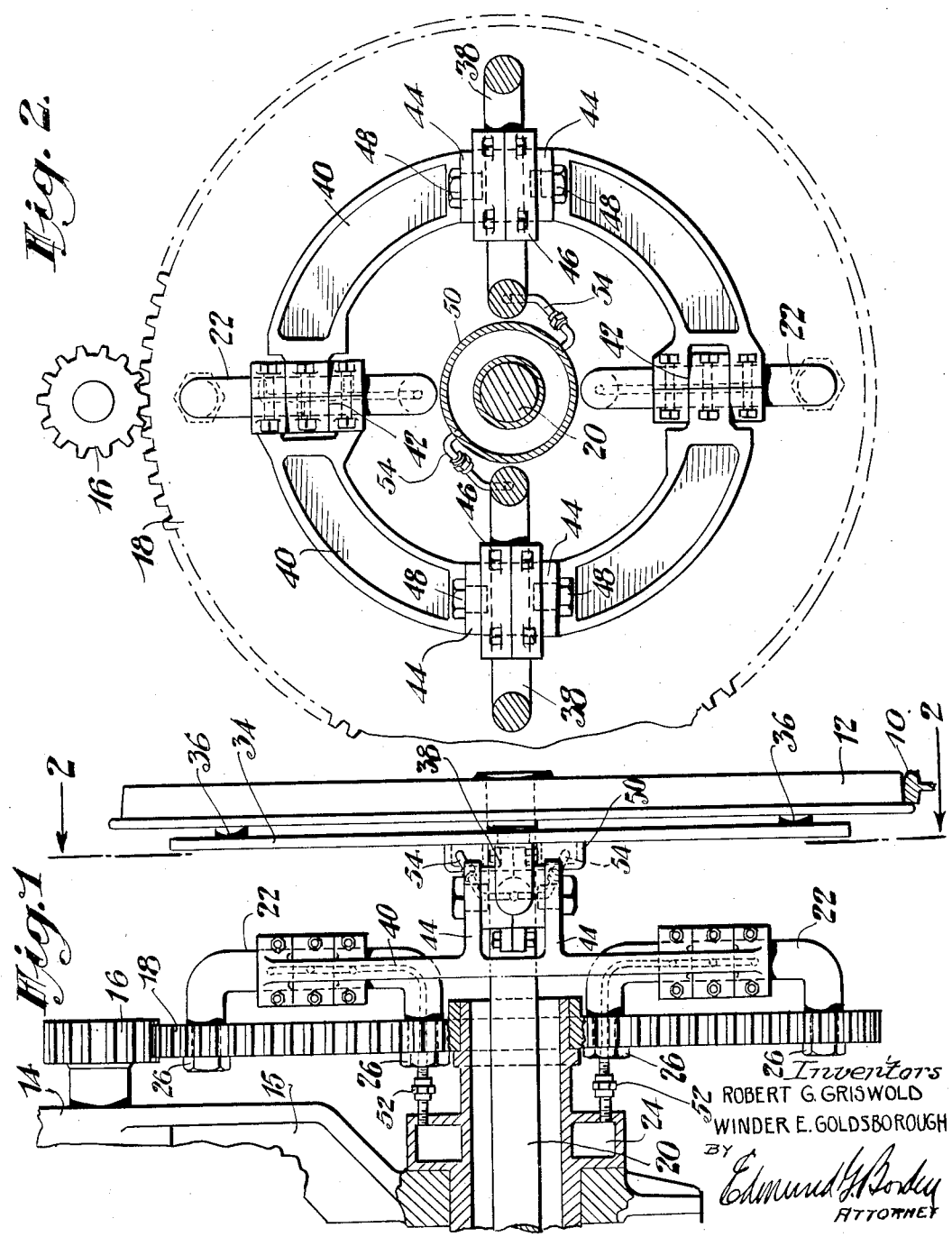

Patented Sept. 5, 1933

1,925,380

UNITED STATES PATENT OFFICE 1,925,380

ROTARY TRANSMISSION

Robert G. Griswold, Westfield, N. J., and Winder E. Goldsborough, South Norwalk, Conn., assignors to Doherty Research Company, New York, N. Y., a corporation of Delaware Application January 15, 1929. Serial No. 332,706

21 Claims. (Cl. 64—97)

The present invention relates to the art of mechanisms for relative displacement either in the radial or axial direction, or both.

A considerable number of mechanisms have been devised and used with more or less success for transmitting rotary motion between driving and driven members subject to relative movement in a radial direction or whose axes are inclined or eccentrically offset. The great majority of mechanisms proposed for such constructions, however, suffer from theoretical errors and therefore are subject to high rates of depreciation and costly upkeep. The problem has been intensified in the electric locomotive, the most difficult of all such adaptations, by the fact that the driving motors are necessarily spring mounted with respect to the track wheels and therefore provision must be made for transmitting the high driving torque from the electric motors to the track wheels under conditions involving both radial and axial movements between the driving and driven members.

It is one of the objects of the present invention to provide a flexible mechanical transmission or coupling adapted for use on electric locomotives and which shall be simple and effective in construction and capable of transmitting large amounts of power under conditions of eccentricity between the driving and driven members or of radial or axial movements between such parts.

Another object of the present invention is to provide a simple and reliable arrangement for the lubrication of heavy duty couplings or transmissions.

In street railway or locomotive work, not only is there a large amount of eccentricity produced by the movement of the springs but the end play or axial movements of the parts are often considerable. It is a further object of the present invention to provide a rugged coupling or flexible transmission adapted to accommodate itself to axial movements of the driving and driven parts with a minimum of error.

Further objects and advantages of the present invention will be apparent to those skilled in the art from the following description.

An apparatus in accordance with the present invention is illustrated in the accompanying drawing; in which Fig. 1 is an elevational view of an apparatus in accordance with the present invention, illustrating the entire mechanism as applied to an electric locomotive being taken on a plane transverse to the track and rails;

Fig. 2 is a sectional view taken on the line 2—2 of the Fig. 1 looking in the direction of the arrows.

In the drawing, 10 is one rail of a railway track on which rests the driver 12 of an electric or other locomotive. In the arrangement illustrated, the track wheel or driver 12 is operated by power from an electric motor 14 suitably suspended on the spring-supported frame of the locomotive, a portion of such frame appearing at 15. Power from the motor is transmitted to the wheel 12 through a pinion 16 meshing with a plate-like gear 18 which surrounds the axle 20 of wheel 12 and which forms a part of the flexible coupling or transmission embodying the present invention. In the form of apparatus illustrated in the drawing, the gear 18 has fixed thereto two bars or pistons 22, 22. The bars 22 of the gear 18 are of U-shape and, as appears more particularly in Fig. 2, the bars 22 are arranged to extend radially of the member 18 along a given diameter thereof, the radial portions of the bars 22 together with their inturned ends, defining a plane including the axis of rotation of the gear or member 18. It will be seen further that the inner ends of the bars 22 are offset from the center of rotation of the gear 18, thereby providing space between their inner ends not only for an aperture to admit of the passage of the axle 20 of wheel 12 through the gear, but also for an oil reservoir 24. The purpose and arrangement of reservoir 24 will be discussed further hereinafter. The inner ends of the bars 22 extend through the web of gear 18 and are fixed to the gear by means of nuts 26, the nuts being placed on the opposite side of the gear 18 from the bodies of the bars 22.

The gear 18 acts as the driving member for the driver or track wheel 12 and the mechanism according to the present invention for transmitting the motion of the gear 18 to the wheel 12 includes a plate 34 fixed to the wheel 12 by bolts 36, 36 or other suitable means. The plate 34 has fixed thereto a pair of U-shaped rods or pistons 38, 38, the rods 38 being positioned radially on the plate 34 on the side looking toward the plate or gear 18. Rods or bars 38 are fixed radially on plate 34 in the manner similar to that described in connection with bars 22 on plate 18. The axial plane in which the radial bars 38 are placed, however, is substantially at right angles to the axial plane including the radial bars 22. This relationship is clear from Figs. 1 and 2. For transmitting the motion between the plates 18 and 34 while permitting radial and end play movements, a pair of semicircular links 40, 40 are employed. As illustrated links 40 are both pivotally and slidably mounted on the bars 22 and their ends are interlocked in hinge-like relation as indicated at 42 so that any sliding or radial movement of one link involves a like movement of the other. The links 40 curve laterally from the bars 22 so that they lie normally approximately in the plane of rotation and parallel to the plates 18 and 34. In order to transmit the motion of the pair of bars 22 to the pair of bars 38, the links 40 are provided preferably at or near their mid-sections, with pairs of ears 44, 44 projecting therefrom substantially at right angles to the plane of rotation and the ears on each link embracing a slide or sleeve member 46. Slides 46 are mounted one on each of the bars 38. The ears 44 are pivoted to the slides 46 as indicated at 48, 48 the axes of the pivots 48 lying normally substantially parallel to the line of the pair of bars 22, 22. Furthermore, the slides 46 may swivel or pivot on the two bars 38, 38 to better accommodate end play and canting motions between the track wheel 12 and the spring mounted frame 15 of the locomotive.

In order to facilitate assembly of the parts the hinged ends 42 of links 40 as well as slides 46 are constructed to form split bearings. It will be apparent however that this is not essential since bars 22 and 38 may be formed in two or more parts for convenient insertion through the slide members.

It will be understood from the foregoing that the operation of the mechanism herein disclosed, permits the parts to operate while the axis of the driving member is eccentric to that of the driven member. Radial movements of the driving member, or the reverse, caused by spring or like action of the parts of the locomotive are accommodate by sliding the links 40 on bars 22, 22 or bars 38, 38 depending on the angular position of plates 18 and 34 at the times the eccentric or radial movements of the parts occur. End play and canting movements are accommodated by swiveling of links 40 on the axis 22, 22 or 38, 38 as well as by swiveling at the pivots 48, 48. It has been found that the mechanism herein disclosed accommodates the abnormal movements of the parts just mentioned with a minimum of theoretical error or angular variation in the movement of the rotating parts, so that the spring movements and end play or canting movements of the locomotive produce substantially no abnormal stresses or shocks during the operation of the apparatus. The links 40 lying normally substantially in the plane of rotation of the bars 22, the rotational stresses are transmitted with a minimum tendency to cant or jam the parts of the apparatus. Furthermore, the links 40 form a symmetrical system which in rotating sets up a minimum of centrifugal stresses. The mechanism therefore is substantially balanced as to rotational movements and can be safely operated at high speed.

According to the present invention, the bearing surfaces of the coupling or transmission herein disclosed are automatically lubricated during the operation of the apparatus. For this purpose, the oil reservoir 24 previously mentioned is provided near the center of the plate like gear 18 and a similar oil reservoir 50 is provided near the center of the plate 34. As shown in Figs. 1 and 2, the oil reservoir 24 lies between the U-bars 22 and the centre of gear 18 and the bearing surfaces on the bars 22 are connected by suitable oil ducts 52 with the reservoir 24. Owing to the relative arrangement of the parts, the centrifugal force due to the revolution of the parts causes the oil to flow out of the reservoir 24 to the bearing surfaces on rods 22 whenever the device is in motion. Similarly oil reservoir 50 is connected to bearing surfaces on the bars 38 by means of ducts 54 appearing in Fig. 2, or oil may be conveyed to the bearing surfaces on bars 38 from oil reservoir 24 and the bearing surfaces on rods 22 by ducts through links 40.

While we have disclosed herein in detail a specific embodiment of the present invention, we do not limit ourselves thereto, but desire to claim the invention broadly both for the purposes and objects hereinabove mentioned and for such others as those skilled in the art may find it to be adapted.

Although as shown the transmission mechanism is positioned inside of the drive wheel of the locomotive it is obvious that it is readily susceptible of being placed in a position overhanging the drive wheel in a manner well known to those skilled in the art.

Having thus described the invention what is claimed as new is:

1. A flexible transmission including in combination a driving element and a driven element, two radial bars mounted thereon for rotation therewith and set in axial planes forming substantially a right angle, a pair of links pivoted at both ends on one of said radial bars and also slidable thereon, said links projecting away from said radial bar and being pivoted to the second radial bar on a line substantially parallel to the first radial bar.

2. A transmission as set forth in claim 1 together with a member slidable on the second radial bar and to which the links are directly pivoted.

3. A transmission as set forth in claim 1 together with a member both slidable and oscillatable on the second radial bar and to which the links are directly pivoted.

4. A flexible coupling for transmitting motion from a driving to a driven member comprising in combination, a bar mounted on one of said members and extending radially of the axis of rotation of said member, a pair of links having both their ends pivoted on said bar, means forming a second radial bar mounted on the other of said members and lying in an axially extending plane making substantially a right angle with the axially extending plane including said first radial bar, said links being pivoted to said second radial bar.

5. A transmission as set forth in claim 4 in which the links lie normally in a plane of rotation.

6. A flexible coupling for transmitting motion from a driving to a driven member comprising in combination, means forming a pair of pivots mounted for rotation on one of said members and extending in the same diametric line perpendicular to the axis of rotation, a pair of links, each of said links having both their ends pivoted on said pivots and also mounted to slide thereon, the ends of said links being interlocked on said pivots to slide together, a second pair of pivots mounted for rotation on the other of said members and extending in the same diametric line perpendicular to the axis of rotation, the centre of rotation of the second pair of pivots being substantially at right angles to the centre of rotation of the first-named pair of pivots, slides on said second pair of pivots and pivotal connections between said links and said slides near the mid-point of the links, said pivotal connections being normally substantially parallel to said first mentioned pair of pivots.

7. A flexible coupling as set forth in claim 6 and in which the inner ends of the two first mentioned pairs of pivots are spaced from the axes of rotation of the respective members on which they are mounted.

8. A flexible coupling as set forth in claim 6 and in which the two first mentioned pairs of pivots are spaced from the axes of rotation of the respective members on which they are mounted together with means forming oil reservoirs on said members lying within the inner ends of said pivots, said members and pivots containing ducts connecting said reservoirs with the bearing surfaces of said two first mentioned pairs of pivots.

9. The flexible coupling as set forth in claim 6 and in which the two links are curved outwardly away from the axes of rotation and lie normally substantially parallel to the plane of rotation.

10. The combination of a driving member, a driven member, a pair of links mounted to slide and swivel about an axis radial to the axis of rotation of one of said members, a pair of slides mounted to reciprocate and swivel about an axis perpendicular to the axis of rotation of the other of said members, said links being pivoted to said slides near the mid-points of said links, the axial lines of said last mentioned pivots being substantially parallel to the axis about which said links are pivoted.

11. The combination in a power transmitting device of a driving and a driven element, oscillation means crosswise of each of said elements, means in combination with said oscillation means whereby said driving and driven elements can move parallel in planes at material angles to one another, and means whereby the lubrication of the bearing surfaces of said means is made inherent thereof.

12. The combination in a power transmitting device of a driving and a driven element, oscillation means crosswise of each of said elements in line with the centers of rotation thereof, means in combination with said oscillation means whereby said driving and driven elements can move parallel in planes at material angles to one another, and means in combination with said oscillation means whereby the distance between said driving and driven elements can be varied.

13. The combination in a power transmitting device of a driving and a driven element, oscillation means crosswise of each of said elements, means in combination with said oscillation means whereby said driving and driven elements can move parallel in planes at material angles to one another, means in combination with said oscillation means whereby the distance between said driving and driven elements can be varied, and means whereby the lubrication of the bearing surfaces of said means is made inherent thereof.

14. The combination in a power transmitting device of a driving and a driven element, oscillation means crosswise of each of said elements in line with the centers of rotation thereof, means in combination with said oscillation means whereby said driving and driven elements can move parallel in planes at material angles to one another, means in combination with said oscillation means whereby the distance between said driving and driven elements can be varied, and means whereby the angularity of the axes of rotation of said driving and driven elements can be varied.

15. The combination in a power transmitting device of a driving and a driven element, oscillation means crosswise of each of said elements, means in combination with said oscillation means whereby said driving and driven elements can move parallel in planes at material angles to one another, means in combination with said oscillation means whereby the distance between said driving and driven elements can be varied, means whereby the angularity of the axes of rotation of said driving and driven elements can be varied, and means whereby the lubrication of the bearing surfaces of said means is made inherent thereof.

16. The combination in a power transmitting device of a driving and a driven element, oscillation means crosswise of each of said elements in line with the centers of rotation thereof, means maintaining said oscillation means at material angles to one another, means whereby said oscillation means move parallel in planes, and means whereby the distance between said planes can be varied.

17. The combination in a power transmitting device of a driving and a driven element, oscillation means crosswise of each of said elements in line with the centers of rotation thereof, means maintaining said oscillation means at material angles to one another, means whereby said oscillation means move parallel in planes, means whereby the distance between said planes can be varied, and means whereby lubrication of the bearing surfaces of said means is made inherent thereof.

18. The combination in a power transmitting device of a driving and a driven element, oscillation means crosswise of each of said elements in line with the centers of rotation thereof, means maintaining said oscillation means at material angles to one another, means whereby said oscillation means move parallel in planes, means whereby the distance between said planes can be varied, means whereby said planes may make variable angles with the axes of rotation of said driving and driven elements, end means whereby lubrication of the bearing surfaces of said means is made inherent thereof.

19. The combination in a power transmitting device of a driving and a driven element, oscillation means crosswise of each of said elements in line with the centers of rotation thereof, means maintaining said oscillation means at right angles to one another, means whereby said oscillation means move parallel in planes, means whereby the distance between said planes can be varied, means whereby the angularity of said axes of rotation can be varied, and means whereby lubrication of the bearing surfaces of said means is made inherent thereof.

20. The combination in a power transmitting device of a driving and a driven element, oscillation means crosswise of each of said elements in line with the centers of rotation thereof, means whereby said oscillation means move parallel in planes at material angles to one another, and means whereby the angularity of the axes of rotation of said driving and driven elements can be varied.

21. The combination in a power transmitting device of a driving and a driven element, oscillation means crosswise of each of said elements in line with the centers of rotation thereof, means whereby said oscillation means move parallel in planes at material angles to one another, means whereby the angularity of the axes of rotation of said driving and driven elements can be varied, and means whereby lubrication of the bearing surfaces of said means is made inherent thereof.

ROBERT G. GRISWOLD.